(12) United States Patent
Boerstler et al.

(10) Patent No.: US 7,446,588 B2
(45) Date of Patent: Nov. 4, 2008

(54) HIGHLY SCALABLE METHODS AND APPARATUS FOR MULTIPLEXING SIGNALS

(75) Inventors: David W. Boerstler, Round Rock, TX (US); Eskinder Hailu, Austin, TX (US); H. Peter Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 10/733,694

(22) Filed: Dec. 11, 2003

(65) Prior Publication Data

US 2005/0129071 A1 Jun. 16, 2005

(51) Int. Cl.
*G06F 1/04* (2006.01)

(52) U.S. Cl. .................. 327/298; 327/294; 327/99

(58) Field of Classification Search .................. 327/99, 327/165, 166, 407, 408, 291, 293, 294, 298
See application file for complete search history.

(56) References Cited

U.S. PATENT DOCUMENTS

| | | | |
|---|---|---|---|
| 4,229,699 A | 10/1980 | Frissell | |
| 4,853,653 A | 8/1989 | Maher | |
| 4,970,405 A | 11/1990 | Hagiwara | |
| 5,099,141 A | 3/1992 | Utsunomiya | |
| 5,122,677 A | 6/1992 | Sato | |
| 5,155,380 A | 10/1992 | Hwang et al. | |
| 5,231,636 A | 7/1993 | Rasmussen | |
| 5,315,181 A | 5/1994 | Schowe | |
| 5,357,146 A | 10/1994 | Heimann | |
| 5,604,452 A * | 2/1997 | Huang | 327/99 |
| 6,365,930 B1 | 4/2002 | Schillaci et al. | |
| 6,453,425 B1 * | 9/2002 | Hede et al. | 713/501 |
| 6,501,304 B1 | 12/2002 | Boerstler et al. | |
| 6,600,355 B1 * | 7/2003 | Nguyen | 327/298 |
| 6,801,074 B2 * | 10/2004 | Meguro | 327/298 |
| 7,245,161 B2 * | 7/2007 | Boerstler et al. | 327/99 |

FOREIGN PATENT DOCUMENTS

| | | |
|---|---|---|
| JP | 08263436 | 10/1996 |
| JP | 08330915 | 12/1996 |
| JP | 2002351818 | 12/2002 |

* cited by examiner

*Primary Examiner*—Kenneth B. Wells
*Assistant Examiner*—Hai L. Nguyen
(74) *Attorney, Agent, or Firm*—Dugan & Dugan

(57) ABSTRACT

In a first aspect, a first method is provided that includes providing a plurality of select signals and a plurality of input signals for input by a multiplexer. Each select signal is adapted to cause the multiplexer to select a different one of the plurality of input signals for output by the multiplexer when the select signal is in a first logic state. The first method further includes preventing a first of the select signals that is in the first logic state from being provided to the multiplexer until the other select signals are in a second logic state. Number other aspects are provided.

17 Claims, 4 Drawing Sheets

US 7,446,588 B2

HIGHLY SCALABLE METHODS AND APPARATUS FOR MULTIPLEXING SIGNALS

FIELD OF THE INVENTION

The present invention relates generally to integrated circuit design, and more particularly to methods and apparatus for multiplexing signals.

BACKGROUND OF THE INVENTION

A need may arise in many data, communications or other similar systems to switch between multiple asynchronous clocks, data signals or the like. Such switching typically is accomplished via multiplexers.

Many conventional multiplexer systems generate spurious signals or "glitches" at multiplexer outputs when the multiplexer systems switch between output signals. Glitches may generate false logic states within an integrated circuit, and may damage sensitive circuit devices. High frequency circuits are especially vulnerable as they may generate large, high frequency glitches that may mix to produce undesirable input or output tones.

Numerous approaches have been proposed for reducing glitches during switching, such as allowing a predetermined time to elapse after switching before a new signal is output (e.g., so that all output nodes of a multiplexer have time to stabilize), or using cascaded edge triggered latches to minimize meta-stability in a data path. Other proposed approaches that relate specifically to switching between clock signals include pulling an output node to a predetermined state in between clock transitions (regardless of the previous state of the output node), requiring a selected clock signal to reach a predetermined logic state before allowing switching, or using edge detection to detect a change in the selection of a specific clock. However, such approaches may result in substantial switching delays, be difficult or expensive to implement and/or fail as the frequency of signal selection increases.

Accordingly, a need exists for improved methods and apparatus for multiplexing signals.

SUMMARY OF THE INVENTION

In a first aspect of the invention, a first method is provided that includes providing a plurality of select signals and a plurality of input signals for input by a multiplexer. Each select signal is adapted to cause the multiplexer to select a different one of the plurality of input signals for output by the multiplexer when the select signal is in a first logic state. The first method further includes preventing a first of the select signals that is in the first logic state from being provided to the multiplexer until the other select signals are in a second logic state.

In a second aspect of the invention, a second method is provided that includes providing a plurality of select signals and a plurality of clock input signals for input by a multiplexer. Each select signal is adapted to cause the multiplexer to select a different one of the plurality of clock input signals for output by the multiplexer when the select signal is in a first logic state. The second method further includes the steps of (1) preventing a first of the select signals that is in the first logic state from being provided to the multiplexer until the other select signals are in a second logic state; and (2) preventing the first of the select signals from reaching the multiplexer until after a rising edge and a falling edge of a corresponding first of the clock input signals. Numerous other aspects are provided, as are systems and apparatus in accordance with these and other aspects of the invention.

Other features and aspects of the present invention will become more fully apparent from the following detailed description, the appended claims and the accompanying drawings.

DETAILED DESCRIPTION

Figure 1:
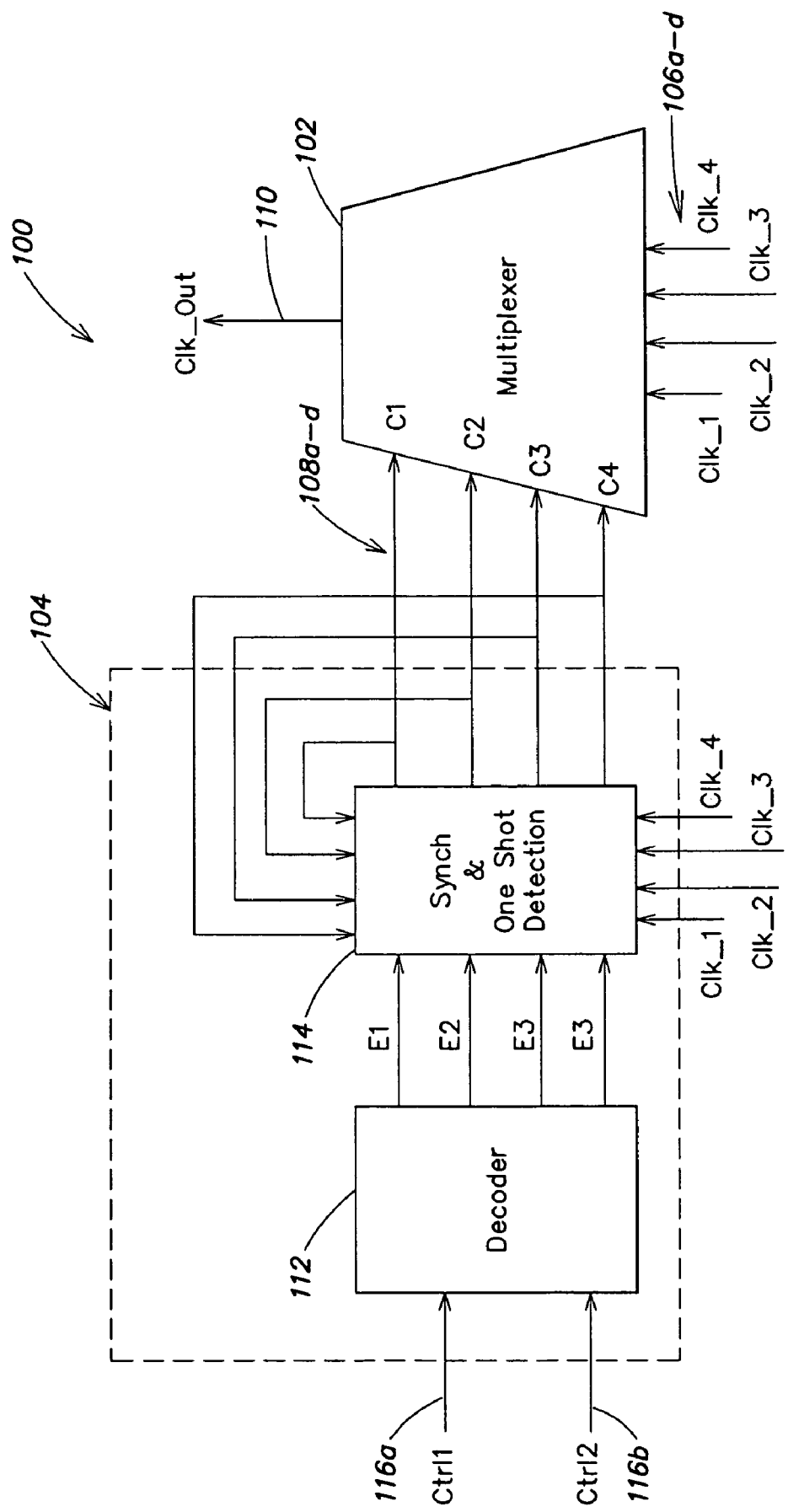
FIG. 1 is a schematic diagram of a multiplexer system provided in accordance with the present invention.

FIG. 1 is a schematic diagram of a multiplexer system 100 provided in accordance with the present invention. With reference to FIG. 1, the multiplexer system 100 includes a multiplexer 102 coupled to a select control circuit 104.

The multiplexer 102 may comprise any conventional multiplexing circuit that employs a plurality of select signals to selectively output one of a plurality of input signals provided to the multiplexer 102. For example, in the embodiment of FIG. 1, the multiplexer 102 comprises (1) a plurality of data input nodes 106*a-d* adapted to receive data input signals (e.g., clock signals such as Clk_1, Clk_2, Clk_3 and Clk_4, respectively, or other data input signals); (2) a plurality of select nodes 108*a-d* adapted to cause the multiplexer 102 to select one of the data input signals provided to one of the data input nodes 106*a-d* in response to "synchronized" select signals C1-C4 (as described below); and (3) an output node 110 adapted to output the selected data input signal (e.g., as Clk_Out). Other numbers of data input, select and/or output nodes may be employed.

Each select node 108*a-d* corresponds to a different one of the plurality of data input nodes 106*a-d*. For example, the first select node 108*a* may correspond to the first input node 106*a*, the second select node 108*b* may correspond to the second input node 106*b*, etc. As will be described further below, when one of the select nodes 108*a-d* of the multiplexer 102 receives a predetermined logic state signal (e.g., a high logic state signal) from the select control circuit 104, the multiplexer 102 outputs (via the output node 110) the data signal provided to the data input node 106*a-d* that corresponds to the select node 108*a-d* that received the predetermined logic state signal. For example, in one embodiment, if the select control logic 104 outputs logic states 1,0,0,0 to the select nodes 108*a-d*, respectively, the multiplexer 102 outputs (via the output node 110) the data input signal provided to the first data input node 106*a* (e.g., clk_1). Likewise, if the select control logic 104 outputs logic states 0,1,0,0 to the select nodes 108*a-d*, respectively, the multiplexer 102 outputs the data input signal provided to the second data input node 106*b* (e.g., clk_2), etc.

The select control circuit 104 includes a decoder 112 coupled to a synchronization and one-shot detection circuit 114. The decoder 112 receives a plurality of control signals 116*a-b* (e.g., Ctrl1 and Ctrl2) and generates a plurality of "unsynchronized" select signals E1-E4. Each unsynchronized select signal E1-E4 is synchronized by the synchronization and one-shot detection circuit 114 to form a synchronized select signal C1-C4, respectively, as described further below. The decoder 112 may comprise any conventional decoding logic. In the embodiment shown, the decoder 112 comprises a 2-to-4 decoder (e.g., as the multiplexer 102 comprises a 4-to-1 multiplexer), although other decoder logic and/or multiplexer sizes may be employed.

The synchronization and one-shot detection circuit 114 includes logic that is adapted to (1) receive the unsynchronized select signals E1-E4 from the decoder 112; (2) ensure that only one of the unsynchronized select signals E1-E4 is in a predetermined logic state (e.g., a high logic state); (3) synchronize each unsynchronized select signals E1-E4 via the clock signals Clk_1-Clk_4, respectively, so as to generate the synchronized select signals C1-C4; and (4) provide the synchronized select signals C1-C4 to the select nodes 108a-d, respectively, of the multiplexer 102. An exemplary embodiment of the synchronization and one-shot detection circuit 114 is described below with reference to FIG. 2.

Figure 2:
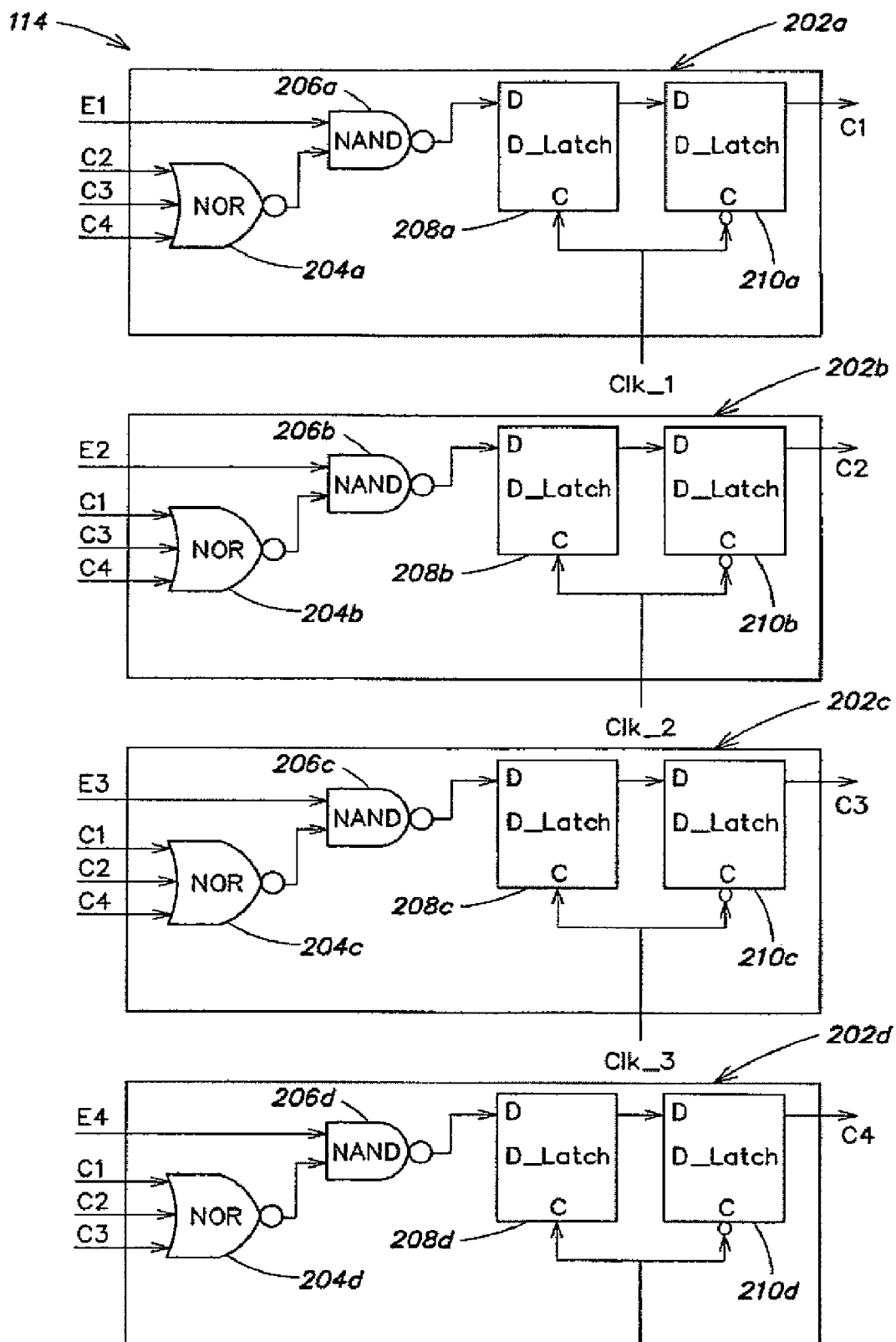
FIG. 2 is a schematic diagram of an exemplary embodiment of the synchronization and one-shot detection (SOSD) circuit of FIG. 1.

FIG. 2 is a schematic diagram of an exemplary embodiment of the synchronization and one-shot detection (SOSD) circuit 114 of FIG. 1. With reference to FIG. 2, the SOSD circuit 114 comprises a plurality of sub-circuits 202a-d each adapted to generate a different one of the synchronized select signals C1-C4 from the unsynchronized select signals E1-E4. For example, the first sub-circuit 202a includes a NOR gate 204a adapted to receive the synchronized select signals C2-C4 that are fed back to the SOSD circuit 114 as shown in FIG. 1 and to perform a NOR operation on the select signals C2-C4. The result of the NOR operation, which will be a high logic state only if the select signals C2-C4 are all in a low logic state, is output to a NAND gate 206a along with the asynchronous select signal E1.

In response to the output of the NOR gate 204a and the asynchronous select signal E1, the NAND gate 206a generates an output that is latched via a first latch 208a (e.g., a D-type latch) in response to a rising edge of the first clock signal Clk_1 and a second latch 210b in response to a falling edge of the first clock signal Clk_1. Note that if the asynchronous select signal E1 is high, indicating that the multiplexer 102 is to output the first clock signal Clk_1, the high logic state may not pass through the NAND gate 206a to the latches 208a, 210a unless the synchronized clock signals C2-C4 are all in a low logic state. Further, once the asynchronous select signal E1 has passed through the NAND gate 206a, it is unable to reach the multiplexer 102 (as the first synchronized select signal C1) until after both a rising and a falling edge of the first clock signal Clk_1. In this manner, the sub-circuit 202a ensures that the first synchronous select signal C1 (1) does not reach the multiplexer 102 unless the remaining synchronous select signals C2-C4 are in a low logic state; and (2) is synchronized with the first clock signal Clk_1. The sub-circuits 202b-202d employ NOR gates 204b-d, NAND gates 206b-d and latches 208b-d, 210b-d, respectively, to similarly ensure that each synchronous select signal C2-C4 (1) does not reach the multiplexer 102 unless the remaining synchronous select signals are in a low logic state; and (2) is synchronized with its respective clock signal Clk2-Clk4.

Through use of the SOSD circuit 114, erroneous enabling of multiple clock signals via the multiplexer 102 is prevented, as only one select signal C1-C4 at a time may reach the multiplexer 102. Likewise, because each select signal C1-C4 is synchronized to a respective clock signal Clk_1-Clk_4, data paths through the multiplexer 102 are enabled/disabled in a substantially glitch-less manner.

Figure 3:
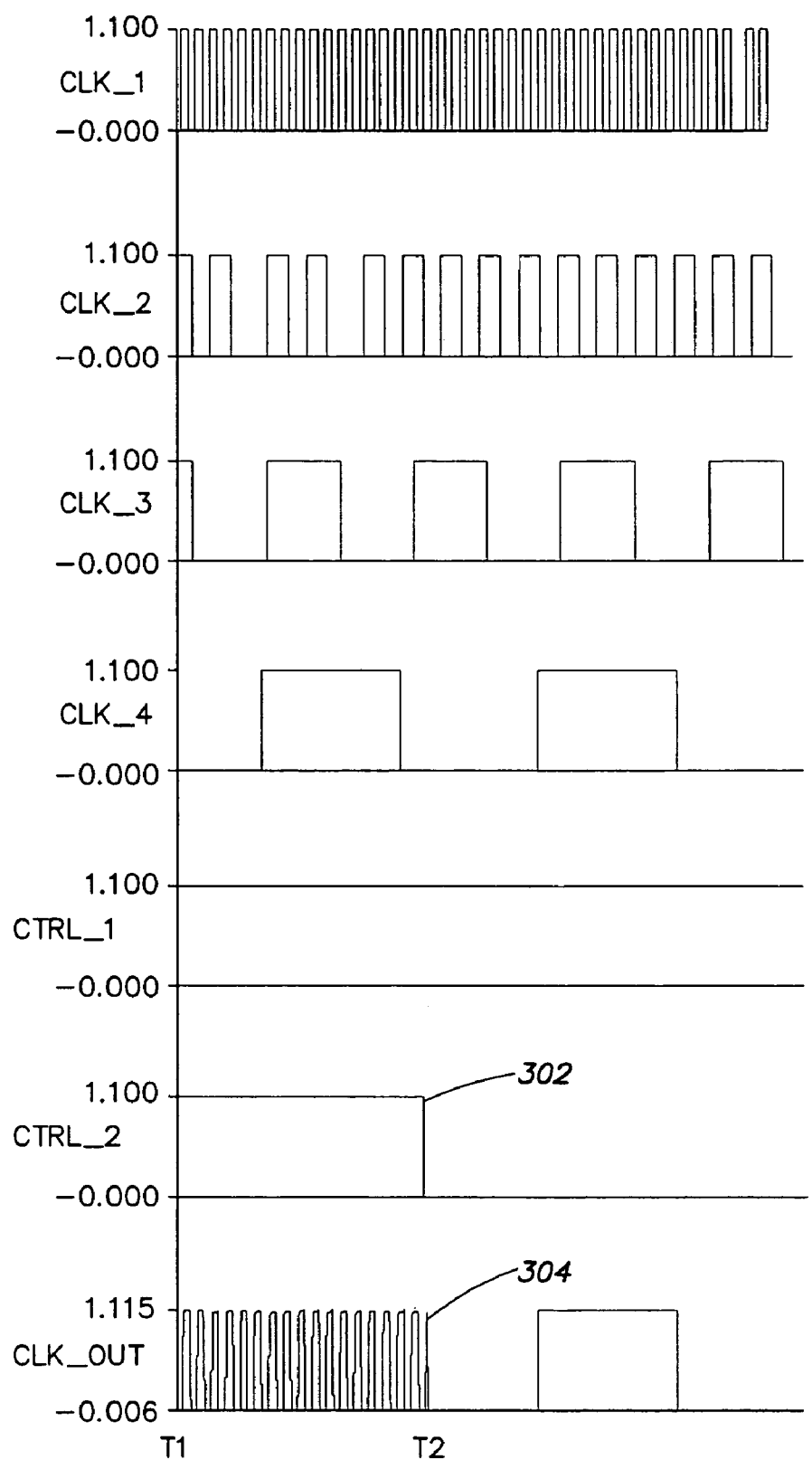
FIG. 3 illustrates the switching characteristics of the multiplexer of FIG. 1 without the SOSD circuit of FIG. 1.

To illustrate operation of the inventive multiplexer system 100 of FIGS. 1 and 2, operation of the multiplexer 102 with and without the SOSD circuit 114 was simulated (e.g., using 10S0 SOI CMOS technology available from International Business Machines Corporation). Specifically, FIG. 3 illustrates the switching characteristics of the multiplexer 102 (FIG. 1) without the SOSD circuit 114 and with the first clock (Clk_1) operating at 5 GHz, the second clock (Clk_2) operating at 1 GHz, the third clock (Clk_3) operating at 500 MHz and the fourth clock (Clk_4) operating at 333 MHz. As shown by the output of the multiplexer 102 (Clk_Out), at time T1 control signals 116a-b (Ctrl1 and Ctrl2) are both high, and the first clock Clk_1 is output from the multiplexer 102. At time T2 (and as indicated by reference numeral 302), the second control signal 116b (Ctrl2) is switched low so that the multiplexer 102 switches from outputting the first clock signal Clk_1 to outputting the fourth clock signal Clk_4. As indicated by reference numeral 304, absent the SOSD circuit 114, such switching may produce a glitch at the output of the multiplexer 102 (Clk_Out). Similar glitches may be produced when switching between any of the clocks Clk_1-Clk_4. Glitches may generate false logic states within an integrated circuit, and may damage sensitive circuit devices. High frequency circuits are especially vulnerable as they may generate large, high frequency glitches that may mix to produce undesirable input or output tones.

Figure 4:
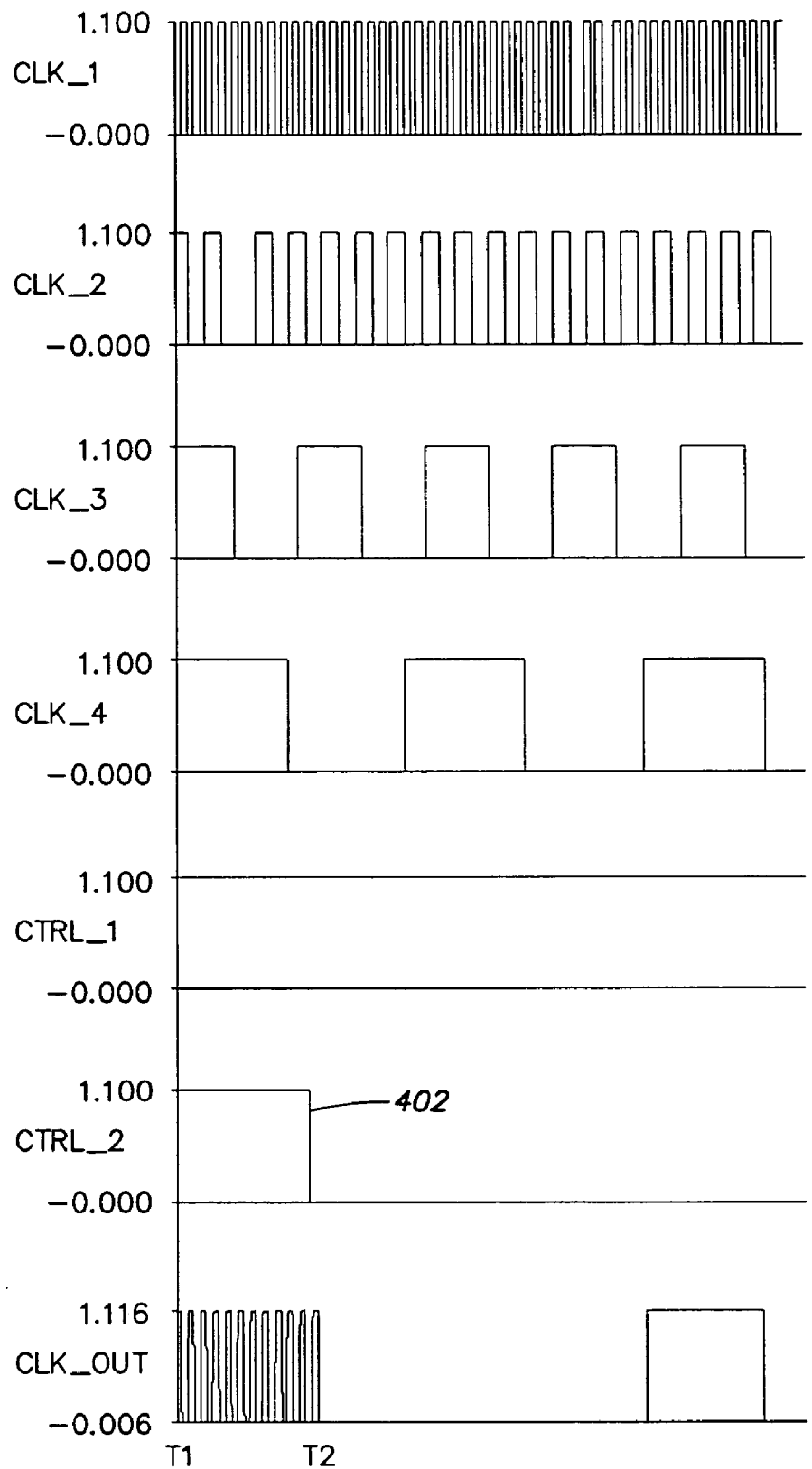
FIG. 4 illustrates the switching characteristics of the multiplexer of FIG. 1 with the SOSD circuit of FIG. 1.

FIG. 4 illustrates the switching characteristics of the multiplexer 102 with the SOSD circuit 114 present. The clock frequencies used to generate the data of FIG. 3 were again employed. As shown by the output of the multiplexer 102 (Clk_Out), at time T1 control signals 116a-b (Ctrl1 and Ctrl2) are both high, and the first clock Clk_1 is output from the multiplexer 102. At time T2 (and as indicated by reference numeral 402), the second control signal 116b (Ctrl2) is switched low so that the multiplexer 102 switches from outputting the first clock signal Clk_1 to outputting the fourth clock signal Clk_4. In contrast to FIG. 3, when the SOSD circuit 114 is employed, such switching does not produce a glitch at the output of the multiplexer 102 (Clk_Out). In fact, glitches are not observed when switching between any of the clocks Clk_1-Clk_4.

The foregoing description discloses only exemplary embodiments of the invention. Modifications of the above disclosed apparatus and methods which fall within the scope of the invention will be readily apparent to those of ordinary skill in the art. For instance, the present invention may be employed to switch between any type of data signals (e.g., data signals other than clock signals). While the inventive multiplexer system 100 has been described with reference to a 4-to-1 multiplexer (e.g., four data inputs to one output), it will be understood that the invention may be employed with larger or smaller multiplexers, multiple output multiplexers or the like. Larger data selection may be achieved (e.g., merely by increasing the fan in of the NOR gates 204a-d). That is, the inventive multiplexer system 100 is highly scalable. Other types of latches (e.g., edge triggered) may be employed for the latches 208a-d and/or 210a-d.

Accordingly, while the present invention has been disclosed in connection with exemplary embodiments thereof, it should be understood that other embodiments may fall within the spirit and scope of the invention, as defined by the following claims.

The invention claimed is:

1. A method for multiplexing signals comprising:
providing a plurality of select signals and a plurality of input signals for input by a multiplexer, each select signal adapted to cause the multiplexer to select a different one of the plurality of input signals for output by the multiplexer when the select signal is in a first logic state; and
preventing a first of the select signals that is in the first logic state from being provided to the multiplexer until the other select signals are in a second logic state.

2. The method of claim 1 wherein the plurality of input signals comprise a plurality of clock signals.

3. The method of claim 2 wherein the plurality of clock signals are asynchronous relative to one another.

4. The method of claim 1 wherein preventing a first of the select signals that is in the first logic state from being provided to the multiplexer until the other select signals are in a second logic state comprises:
performing a NOR operation on the other select signals to generate a NOR output; and
performing a NAND operation on the first of the select signals and the NOR output.

5. The method of claim 1 further comprising synchronizing the first of the select signals with a corresponding first of the input signals of the multiplexer prior to provide the first of the select signals to the multiplexer.

6. The method of claim 5 wherein synchronizing the first of the select signals comprises preventing the first of the select signals from reaching the multiplexer until after a rising edge and a falling edge of the first of the input signals.

7. A method for multiplexing signals comprising:
providing a plurality of select signals and a plurality of clock input signals for input by a multiplexer, each select signal adapted to cause the multiplexer to select a different one of the plurality of clock input signals for output by the multiplexer when the select signal is in a first logic state;
preventing a first of the select signals that is in the first logic state from being provided to the multiplexer until the other select signals are in a second logic state; and
preventing the first of the select signals from reaching the multiplexer until after a rising edge and a falling edge of a corresponding first of the clock input signals.

8. A multiplexer system comprising:
a multiplexer having:
a plurality of data input nodes adapted to receive a plurality of input signals;
an output node adapted to selectively output one of the plurality of input signals; and
a plurality of select nodes, each select node corresponding to a different one of the plurality of data input nodes and adapted to cause the multiplexer to select a different one of the plurality of input signals for output by the output node in response to a select signal of a first logic state being provided to the select node; and
selection circuitry coupled to the multiplexer and adapted to prevent a first of the select signals that is in the first logic state from being provided to the multiplexer until the other select signals are in a second logic state.

9. The multiplexer system of claim 8 wherein the plurality of input signals comprise a plurality of clock signals.

10. The multiplexer system of claim 8 wherein the selection circuitry comprises one-shot logic adapted to:
input a select signal for each select node of the multiplexer; and
determine if only one of the input select signals is in the first logic state, and if so, output at least the select signal that is in the first logic state.

11. The multiplexer system of claim 10 wherein the selection circuitry further comprises synchronization logic coupled to the one-shot logic and the multiplexer and adapted to:
synchronize the select signal that is in the first logic state with a corresponding one of the input signals of the multiplexer; and
output the synchronized select signal to a respective select node of the multiplexer.

12. The multiplexer system of claim 10 wherein the selection circuitry further comprises decoder logic coupled to the one-shot logic and adapted to receiver a plurality of control signals and to generate each select signal based on the control signals.

13. The multiplexer system of claim 10 wherein the selection circuitry is adapted to:
perform a NOR operation on the other select signals to generate a NOR output; and
perform a NAND operation on the first of the select signals and the NOR output.

14. The multiplexer system of claim 10 further comprising synchronization logic adapted to synchronize the first of the select signals with a corresponding first of the input signals of the multiplexer before the first of the select signals is provided to the multiplexer.

15. The multiplexer system of claim 14 wherein synchronization logic is adapted to prevent the first of the select signals from reaching the multiplexer until after a rising edge and a falling edge of the first of the input signals.

16. A multiplexer system comprising:
a multiplexer having:
a plurality of data input nodes adapted to receive a plurality of input signals;
an output node adapted to selectively output one of the plurality of input signals; and
a plurality of select nodes, each select node corresponding to a different one of the plurality of data input nodes and adapted to cause the multiplexer to select a different one of the plurality of input signals for output by the output node in response to a select signal of a first logic state being provided to the select node; and
selection circuitry coupled to the multiplexer and adapted to:
prevent a first of the select signals that is in the first logic state from being provided to the multiplexer until the other select signals are in a second logic state; and
prevent the first of the select signals from reaching the multiplexer until after a rising edge and a falling edge of a corresponding first of the input signals of the multiplexer.

17. A multiplexer system comprising:
a multiplexer having:
a plurality of data input nodes adapted to receive a plurality of input signals;
an output node adapted to selectively output one of the plurality of input signals;
a plurality of select nodes, each select node corresponding to a different one of the plurality of data input nodes and adapted to select a different one of the plurality of input signals for output by the output node in response to a select signal of a first logic state being provided to the select node;
one-shot logic adapted to:
input a select signal for each select node of the multiplexer; and
determine if only one of the input select signals is in the first logic state, and if so, output at least the select signal that is in the first logic state; and
synchronization logic coupled to the one-shot logic and the multiplexer and adapted to:
synchronize the select signal that is in the first logic state output from the one-shot logic with a corresponding one of the input signals of the multiplexer; and
output the synchronized select signal to a respective select node of the multiplexer.

* * * * *